(12) United States Patent
Tseng et al.

(10) Patent No.: US 11,510,215 B2
(45) Date of Patent: Nov. 22, 2022

(54) ELECTRONIC DEVICE AND METHOD FOR RADIO RESOURCE MANAGEMENT (RRM) MEASUREMENT RELAXATION

(71) Applicant: MEDIATEK INC., Hsinchu (TW)

(72) Inventors: Li-Chuan Tseng, Hsinchu (TW); Chi-Hsuan Hsieh, Hsinchu (TW); Din-Hwa Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 154 days.

(21) Appl. No.: 16/828,107

(22) Filed: Mar. 24, 2020

(65) Prior Publication Data

US 2020/0314868 A1   Oct. 1, 2020

Related U.S. Application Data

(60) Provisional application No. 62/825,093, filed on Mar. 28, 2019.

(51) Int. Cl.
*H04B 17/318* (2015.01)
*H04W 72/08* (2009.01)
(Continued)

(52) U.S. Cl.
CPC ........ *H04W 72/085* (2013.01); *H04B 17/318* (2015.01); *H04W 8/08* (2013.01); *H04W 24/10* (2013.01); *H04W 64/00* (2013.01)

(58) Field of Classification Search
CPC . H04W 36/0085; H04W 36/06; H04W 24/10; H04W 24/08; H04W 36/08;
(Continued)

(56) References Cited

U.S. PATENT DOCUMENTS 10,524,142 B2 * 12/2019 Kusashima ......... H04W 72/085
10,568,024 B2 *  2/2020 Nam ..................... H04W 48/18
(Continued)

FOREIGN PATENT DOCUMENTS

CN         104126321 A    10/2014
CN         106465163 A     2/2017
WO    WO 2018/174804 A1   9/2018

OTHER PUBLICATIONS

Combined Taiwanese Office Action and Search Report dated Dec. 29, 2021 in corresponding Taiwanese Patent Application No. 109110369 (with English Translation of Category of Cited Documents), 6 pages.

(Continued)

*Primary Examiner* — Joseph Arevalo
(74) *Attorney, Agent, or Firm* — Oblon, McClelland, Maier & Neustadt, L.L.P.

(57) ABSTRACT

Aspects of the disclosure provide an electronic device including processing circuitry and a method for radio resource management (RRM) measurements. The processing circuitry determines, based on a signal received in a serving cell for the electronic device, a location and mobility of the electronic device. The electronic device is in one of a first state and a second state for RRM measurements. A normal level of RRM measurements is implemented for one or more neighboring cells when the electronic device is in the first state, and a relaxed level of RRM measurements is implemented for the one or more neighboring cells when the electronic device is in the second state. The processing circuitry determines whether the electronic device is to be switched from the one of the first state and the second state to another of the first state and the second state based on the mobility and the location.

18 Claims, 5 Drawing Sheets

(51) Int. Cl.
*H04W 24/10* (2009.01)
*H04W 64/00* (2009.01)
*H04W 8/08* (2009.01)

(58) Field of Classification Search
CPC ............... H04W 48/20; H04W 56/001; H04W 56/0055; H04W 64/00; H04W 72/0446; H04W 72/0453; H04W 72/085; H04W 76/15; H04W 76/28; H04W 80/02; H04W 8/08
USPC .................. 370/329, 237, 277, 331; 455/458
See application file for complete search history.

(56) References Cited

U.S. PATENT DOCUMENTS

| | | | |
|---|---|---|---|
| 10,932,150 B2* | 2/2021 | Murray | H04L 5/0048 |
| 2015/0119039 A1 | 4/2015 | Virtej et al. | |
| 2015/0172907 A1* | 6/2015 | Jung | H04W 24/10 370/329 |
| 2015/0271859 A1* | 9/2015 | Huang | H04L 5/0092 370/329 |
| 2016/0360438 A1 | 12/2016 | Yiu et al. | |
| 2017/0201306 A1* | 7/2017 | Shimezawa | H04L 5/0051 |
| 2018/0199328 A1* | 7/2018 | Sang | H04W 36/06 |
| 2018/0324488 A1* | 11/2018 | He | H04N 21/4424 |
| 2019/0069192 A1* | 2/2019 | Palenius | H04W 24/10 |
| 2019/0223097 A1* | 7/2019 | Yi | H04W 52/0216 |
| 2019/0238287 A1* | 8/2019 | Zhou | H04L 5/0035 |
| 2019/0261207 A1* | 8/2019 | Uchiyama | H04L 47/29 |
| 2019/0319686 A1* | 10/2019 | Chen, IV | H04B 7/088 |
| 2019/0369201 A1* | 12/2019 | Akkarakaran | G01S 1/0428 |
| 2019/0372688 A1* | 12/2019 | Sadiq | H04B 7/0695 |
| 2020/0022040 A1* | 1/2020 | Chen | H04W 36/0085 |
| 2020/0137601 A1 | 4/2020 | Siomina et al. | |
| 2020/0137714 A1* | 4/2020 | Kumar | G01S 5/0236 |
| 2020/0162939 A1* | 5/2020 | Kim | H04W 16/28 |
| 2020/0266942 A1* | 8/2020 | Akkarakaran | H04L 5/001 |
| 2020/0374725 A1* | 11/2020 | Chen | H04B 7/0617 |
| 2021/0185757 A1* | 6/2021 | Purkayastha | H04W 76/28 |
| 2021/0321335 A1* | 10/2021 | Xu | H04W 72/085 |
| 2021/0321359 A1* | 10/2021 | Kumar | H04W 72/046 |

OTHER PUBLICATIONS

International Search Report and Written Opinion dated Jun. 30, 2020 in PCT/CN2020/081648, citing documents AO, AP, AQ, AX and AY therein, 10 pages.
"UE Power Consumption Reduction in RRM Measurements", 3GPP TSG RAN WG1 Meeting #95, R1-1813622, 7.2.9.3, Nokia, Nokia Shanghai Bell, Nov. 12-16, 2018, 7 pages.
"Power Saving for RRM Measurements in NR", 3GPP TSG-RAN WG2 Meeting #107bis, R2-1913002, 6.11.6, MediaTek Inc., Oct. 14-18, 2019, 6 pages.

* cited by examiner

FIG. 5

ELECTRONIC DEVICE AND METHOD FOR RADIO RESOURCE MANAGEMENT (RRM) MEASUREMENT RELAXATION

INCORPORATION BY REFERENCE

This present application claims the benefit of priority to U.S. Provisional Application No. 62/825,093, "RRM Measurement Relaxation Mechanism" filed on Mar. 28, 2019, which is incorporated by reference herein in its entirety.

TECHNICAL FIELD

The present application relates generally to wireless communication technology including radio resource management (RRM) measurement.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An electronic device can communicate with a wireless communication network by transmitting and receiving signals wirelessly. Quality of the communication can vary, for example, when the electronic device moves. Radio resource management (RRM) measurements can be implemented to help maintain the quality in a communication system.

SUMMARY

Aspects of the disclosure provide an electronic device including processing circuitry and a method for radio resource management (RRM) measurements. The processing circuitry can determine, based on a signal received in a serving cell for an electronic device, a location of the electronic device within the serving cell and mobility of the electronic device. The electronic device can be in one of a first state and a second state for RRM measurements. A normal level of RRM measurements can be implemented for one or more neighboring cells of the serving cell when the electronic device is in the first state, and a relaxed level of RRM measurements can be implemented for the one or more neighboring cells when the electronic device is in the second state. The processing circuitry can determine whether the electronic device is to be switched from the one of the first state and the second state to another of the first state and the second state based on the mobility and the location. When the electronic device is determined to be switched, the processing circuitry can implement a level of RRM measurements for the other of the first state and the second state.

In an embodiment, the processing circuitry can determine the location based on signal strength of the received signal. The location can be one of 1) a first location being not at a cell edge of the serving cell and 2) a second location being at the cell edge of the serving cell. The processing circuitry can determine the mobility based on a signal variation of the received signal where the mobility can be one of 1) a low mobility and 2) a high mobility.

In an example, the one of the first state and the second state is the first state. The other of the first state and the second state is the second state. During a period T1, the processing circuitry can determine that the location is the first location when that the signal strength is larger than a threshold I1. The processing circuitry can determine that the mobility is the low mobility when that the signal variation is less than or equal to a threshold S1. The processing circuitry can determine that the electronic device is to be switched from the first state to the second state when the mobility is determined to be the low mobility and the location is determined to be the first location.

In an example, the electronic device is determined to be switched from the first state to the second state. The processing circuitry can implement the relaxed level of RRM measurements that includes one of: 1) no RRM measurements for the one or more neighboring cells, and 2) RRM measurements for the one or more neighboring cells with at least one relaxed period that is longer than a normal period P1 for the normal level of RRM measurements.

In an example, the one or more neighboring cells include a first subset with an identical carrier frequency as that of the serving cell and a second subset with carrier frequencies different from that of the serving cell. The processing circuitry can implement the RRM measurements with the at least one relaxed period by implementing the RRM measurements for the first subset with a relaxed period P2 that is longer than the normal period P1 and by implementing no RRM measurements or the RRM measurements with a relaxed period P3 that is longer than the normal period P1 for the second subset. The at least one relaxed period can include P2 and P3.

In an example, the one of the first state and the second state is the second state. The other of the first state and the second state is the first state. During a period T2, the processing circuitry can determine that the location is the second location when that the signal strength is less than or equal to a threshold I2. The processing circuitry can determine that the mobility is the high mobility when that the signal variation is larger than a threshold S2. The processing circuitry can determine that the electronic device is to be switched from the second state to the first state when the mobility is determined to be the high mobility or the location is determined to be the second location.

In an example, the one of the first state and the second state is the first state. The other of the first state and the second state is the second state. The processing circuitry can determine largest neighbor signal strength based on one or more signals from the respective one or more neighboring cells. During the period T1, the processing circuitry can determine that the location is the first location when that the signal strength is larger than a sum of 1) the largest neighbor signal strength and 2) a threshold D1. The processing circuitry can determine that the mobility is the low mobility when that the signal variation is less than or equal to a threshold S1. The processing circuitry can determine that the electronic device is to be switched from the first state to the second state when the mobility is determined to be the low mobility and the location is determined to be the first location.

In an example, the one of the first state and the second state is the second state. The other of the first state and the second state is the first state. The processing circuitry can determine largest neighbor signal strength based on one or more signals from the respective one or more neighboring cells. During a period T2, the processing circuitry can determine that the location is the second location when the signal strength is less than or equal to a sum of 1) the largest neighbor signal strength and 2) a threshold D2. The processing circuitry can determine that the mobility is the high mobility when that the signal variation is larger than a threshold S2. The processing circuitry can determine that the electronic device is to be switched from the second state to the first state when the mobility is determined to be the high mobility or the location is determined to be the second location.

In an example, a plurality of beams is configured in the serving cell between the electronic device and a network. The signal strength of the received signal is one of 1) largest beam strength of the plurality of beams and 2) average beam strength of a subset of the plurality of beams, the subset having one or more beam strengths larger than a beam strength threshold.

Aspects of the disclosure provide an electronic device including processing circuitry and a method for configuration of RRM measurements. The processing circuitry can configure a relaxation mode for an electronic device. The relaxation mode can indicate that mobility and a location of the electronic device are used to determine whether the electronic device is to be switched between a normal level of RRM measurements and a relaxed level of RRM measurements. The processing circuitry can configuring parameters used to determine whether the electronic device is to be switched between the normal level of RRM measurements and the relaxed level of RRM measurements.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
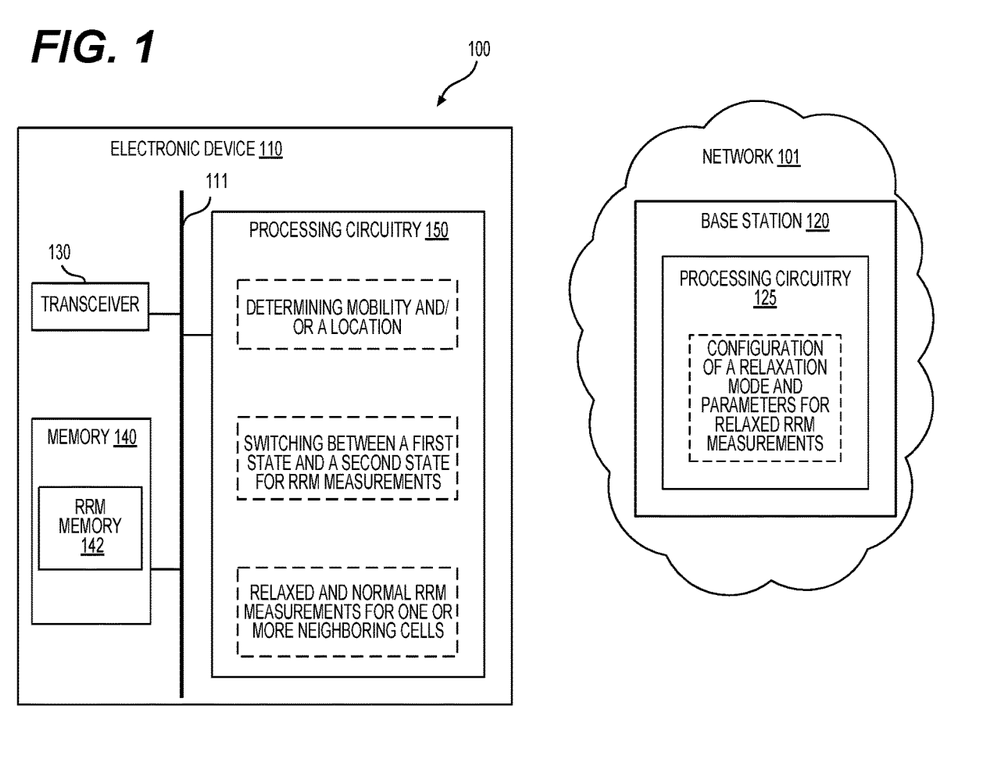
FIG. 1 shows a block diagram of an exemplary communication system 100 according to an embodiment of the disclosure.

FIG. 1 shows a block diagram of an exemplary communication system 100 according to an embodiment of the disclosure. The communication system 100 includes a network 101 and an electronic device 110 that receives wireless communication service from the network 101. The electronic device 110 can be served by a serving cell. One or more neighboring cells of the serving cell can be adjacent to the serving cell. The electronic device 110 can be configured to communicate wirelessly with the network 101 via a wireless link (or a link). Radio resource management (RRM) measurements can be implemented, for example, to maintain link quality. RRM measurements can include measurements for cell(s), such as the serving cell, the one or more neighboring cells, and/or the like, and thus can be implemented in cell selection/reselection and/or a handover procedure.

When the one or more neighboring cells include multiple neighboring cells and/or multiple carrier frequencies that are different from a carrier frequency of the serving cell, power consumption for RRM measurements can be relatively large. According to aspects of the disclosure, the electronic device 110 can be configured to implement relaxed RRM measurements or a relaxed level of RRM measurements. The electronic device 110 can be configured with multiple states (e.g., a first state and a second state) corresponding to multiple levels (e.g., a normal level and the relaxed level) of RRM measurements, respectively. The normal level of RRM measurements (also referred to as normal RRM measurements) can be implemented for the one or more neighboring cells when the electronic device 110 is in the first state for RRM measurements, and the relaxed level of RRM measurements can be implemented for the one or more neighboring cells when the electronic device 110 is in the second state for RRM measurements. In an example, a number of RRM measurements for the one or more neighboring cells in the relaxed level is less than a number of RRM measurements for the one or more neighboring cells in the normal level.

The electronic device 110 can be in a current state that is one of the first state and the second state. A location of the electronic device 110 within the serving cell and/or mobility of the electronic device 110 can be determined based on, for example, a signal received in the serving cell. Based on the mobility and/or the location, whether the electronic device 110 is to be switched from the current state to a next state can be determined where the next state is one of the first state and the second state and different from the current state. When the electronic device 110 is determined to be switched from the current state to the next state, a level (e.g., the normal level or the relaxed level) of RRM measurements for the next state can be implemented. In an embodiment, the electronic device 110 is in an idle mode (e.g., radio resource control (RRC) IDLE), an inactive mode (e.g., RRC INACTIVE), or the like. In an example, the network 101 includes a fifth generation (5G) radio access network (RAN) (or Next Generation (NG) RAN) and a 5G core network (5GC) that uses 5G mobile network technology. A base station 120 in the network 101 is a next generation Node B (gNB) specified in 5G new radio (NR) air interface standards developed by 3rd Generation Partnership Project (3GPP).

The network 101 includes various base stations, such as the base station 120, and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and fourth generation (4G) mobile network technologies, 5G mobile network technology, global system for mobile communication (GSM), long-term evolution (LTE), NR technology, and the like. In some examples, the network 101 employs wireless communication technologies developed by 3GPP. In an example, the base stations in the network 101 form one or more access networks and the core nodes form one or more core networks. An access network can be a RAN, such as a 5G RAN or NG RAN. A core network can be an evolved packet core (EPC), a 5GC, and the like.

In various examples, the base station 120 can be referred to as a Node B, an evolved Node B, a gNB, and the like. The base station 120 includes hardware components and software components configured to enable wireless communications between the base station 120 and the electronic device 110. Further, the core nodes include hardware components and software components to form a backbone to manage and control the services provided by the network 101.

In some embodiments, high frequencies, also referred to as millimeter Wave (mmWave) frequencies are used as carrier frequencies in the communication system 100 to increase a network capacity. In an example, the high frequencies are higher than 6 giga-Hertz (GHz), such as between 24-84 GHz. In an example, carrier frequencies less than 6 GHz are referred to as low frequencies, such as between 600 MHz to less than 6 GHz. For example, a frequency range 1 (FR1) includes frequencies below 6 GHz and a frequency range 2 (FR2) includes frequencies in the range 24.25-52.6 GHz. Signals (or beams) having mmWave frequencies as carrier frequencies, referred to as high frequency (HF) signals, can experience large propagation loss and can be sensitive to blockage. Accordingly, for the HF signals, the base station 120 and the electronic device 110 can perform beamformed transmission and/or reception to compensate for the propagation loss. In beamformed transmission, signal energy can be focused predominantly toward a specific direction. As a result, an increased antenna transmission gain can be achieved in contrast to omnidirectional antenna transmission. Similarly, in beamformed reception, signal energy received predominantly from a specific direction can be combined to obtain a higher antenna reception gain in contrast to omnidirectional antenna reception.

In beamformed transmission/reception, one or more beams (or directional beams) can be configured between the electronic device 110 and the network 101 (e.g., the base station 120) in a cell, such as the serving cell or one of the one or more neighboring cells, to communicate user data, control information, and/or the like.

In an embodiment, the electronic device 110 can be any suitable electronic device that implements the relaxed RRM measurements or the relaxed level of RRM measurements. In an example, the electronic device 110 is a terminal device (e.g., user equipment) for wireless communication, such as a cell phone, a smart phone, a tablet computer, a laptop, a smart device, a wearable device, and the like.

Referring to FIG. 1, the electronic device 110 can include a transceiver 130, processing circuitry 150, and memory 140 that are coupled together, for example, using a bus architecture 111. The transceiver 130 can be configured to receive signals from and transmit signals to the network 101 (e.g., the base station 120) in the serving cell, the one or more neighboring cells, and/or the like. The signals can include the HF signals (e.g., FR2) and the LF signals (e.g., FR1). The signals can be sent via directional beams or beam pairs in beamformed transmission/reception.

The signals can include reference signals (RSs) that can be used to estimate a link quality of the link between the electronic device 110 and the network 101, cell qualities of the respective serving cell and the one or more neighboring cells, and/or the like. The RSs can include a channel-state information reference signal (CSI-RS), a synchronization signal block (SSB), and the like. In some embodiments, an SSB that includes resources in time and frequency is formed with a primary synchronization signal (PSS), a secondary synchronization signal (SSS), and a Physical Broadcast Channel (PBCH).

The processing circuitry 150 can be configured to determine the mobility and/or the location of the electronic device 110 and determine whether to switch the electronic device 110 from one of the first state and the second state to another of the first state and the second state based on the mobility and/or the location of the electronic device 110. Further, the processing circuitry can be configured to implement a level of RRM measurements for the one or more neighboring cells based on a state (e.g., the first state, the second state) of the electronic device 110.

In an embodiment, the location of the electronic device 110 can be a first location that is not at a cell edge of the serving cell or a second location that is at the cell edge of the serving cell. The processing circuitry 150 can determine the location based on, for example, a signal (e.g., a RS) in the serving cell that is received by the transceiver 130. For example, the processing circuitry 150 determines the location based on cell quality of the serving cell. The processing circuitry 150 can determine the location based on signal strength, such as reference signal received power (RSRP), reference signal received quality (RSRQ), signal to interference plus noise ratio (SINR), or the like of the signal in the serving cell. The processing circuitry 150 can determine that the location is the first location when the signal strength satisfies a condition, for example, the signal strength is larger than a threshold l1. The processing circuitry 150 can determine that the location is the second location when the signal strength satisfies a condition, for example, the signal strength is less than or equal to a threshold l2.

The processing circuitry 150 can determine the location based on the signal in the serving cell and neighboring signal(s) (e.g., RS(s)) in the one or more neighboring cells. The processing circuitry 150 can determine largest neighbor signal strength (e.g., a largest RSRP, largest RPRP) based the neighboring signal(s). Further, the processing circuitry 150 can determine that the location is the first location when the signal strength satisfies a condition, for example, the signal strength is larger than a sum of the largest neighbor signal strength and a threshold D1. The processing circuitry 150 can determine that the location is the first location when a difference between the signal strength and the largest neighbor signal strength is larger than the threshold D1.

The processing circuitry 150 can determine that the location is the second location when the signal strength satisfies a condition, for example, the signal strength is less than or equal to a sum of the largest neighbor signal strength and a threshold D2. The processing circuitry 150 can determine that the location is the second location when the difference between the signal strength and the largest neighbor signal strength is less than or equal to the threshold D2. The processing circuitry 150 can determine the location based on cell qualities of the serving cell and the one or more neighboring cells.

As described above, in a first scenario, the processing circuitry 150 can determine whether the location is the second location based on the signal strength in the serving cell and the threshold l2. In a second scenario, the processing circuitry 150 can determine whether the location is the second location based on the signal strength of the serving cell, the largest neighbor signal strength, and the threshold D2. In some examples, signal strength (e.g., RSRP(s)) of the one or more neighboring cells is not measured or is not available (e.g., when no RRM measurements are implemented in the second state), and thus the largest neighbor signal strength can be considered as zero, and thus the first scenario and the second scenario are the same when the thresholds l2 and D2 are equal. In an example, when no RRM measurements are implemented in the second state, signal strength of the one or more neighboring cells in the first state may not be considered. Thus, when the processing circuitry 150 determines whether the location is the first location, the largest neighbor signal strength can also be considered as zero.

In an embodiment, the mobility can be determined as a low mobility or a high mobility. The processing circuitry 150 can determine the mobility based on a signal variation of the signal in the serving cell. The signal variation can be a variation of the signal strength (e.g., RSRP) of the signal in the serving cell. The processing circuitry 150 can determine that the mobility is the low mobility when the signal variation satisfies a condition, for example, the signal variation is less than or equal to a threshold S1. The electronic device 110 can be considered as having the low mobility when the electronic device 110 is stationary (e.g., the signal variation is zero). The processing circuitry 150 can determine that the mobility is the high mobility when the signal variation satisfies a condition, for example, the signal variation is larger than a threshold S2.

One or more of the thresholds S1, S2, l1, l2, D1, and D2 can be configured by the network 101 (e.g., the base station 120) and signaled to the electronic device 110 or pre-configured and stored in the memory 140.

The processing circuitry 150 can be configured to switch the electronic device 110 from one of the first state and the second state to another of the first state and the second state based on the mobility and/or the location of the electronic device 110. In an embodiment, the electronic device 110 is in a current state (e.g., the one of the first state and the second state). The processing circuitry 150 can determine whether the electronic device 110 is to be switched from the current state to a next state (e.g., the other of the first state and the second state) based on the mobility and/or the location. When the electronic device 110 is determined to be switched from the current state to the next state, the processing circuitry 150 can be configured to implement a level of RRM measurements for the one or more neighboring cells based on the next state.

When the next state is the first state, the processing circuitry 150 can implement the normal level of RRM measurements for the one or more neighboring cells of the serving cell. For example, the processing circuitry 150 can implement the normal RRM measurements for the one or more neighboring cells with a normal period (also referred to as a normal interval) P1.

When the next state is the second state, the processing circuitry 150 can implement the relaxed level of RRM measurements for the one or more neighboring cells of the serving cell. In general, the relaxed level includes a less number of RRM measurements than those at the normal level. In an embodiment, the relaxed level of RRM measurements includes RRM measurements for the one or more neighboring cells with at least one relaxed period (also referred to as at least one relaxed interval) that is longer than the normal period P1. In an example, the processing circuitry 150 can implement no RRM measurements for the one or more neighboring cells at the relaxed level.

In an example, when the signal strength of the serving cell is above an S-threshold, the electronic device 110 is considered to be located at a center of the serving cell, and thus no RRM measurements are implemented. The electronic device 110 can be in a connected mode (e.g., RRC_CONNECTED) or RRC_IDLE/INACTIVE.

In an example, the at least one relaxed period includes a relaxed period (or a relaxed interval) P2 that is longer than the normal period P1, and the processing circuitry 150 can implement the relaxed RRM measurements for the one or more neighboring cells with the relaxed period P2, and thus the relaxed RRM measurements can be considered as time-domain relaxation. The relaxed period P2 can be written as P2=M×P1 where M is a scaling factor that is larger than 1. M can be 2, 4, 16, or the like. In an example, the processing circuitry 150 can implement the relaxed RRM measurements for the one or more neighboring cells with a long and fixed period Pf, such as 2 hours, 24 hours, or the like.

In an example, the one or more neighboring cells include multiple neighboring cells. The multiple neighboring cells include a first subset (referred to as intra-frequency neighboring cell(s)) with an identical carrier frequency as that of the serving cell and a second subset (referred to as inter-frequency neighboring cell(s)) with carrier frequencies different from that of the serving cell. For the first subset (or intra-frequency neighboring cell(s)), the processing circuitry 150 can implement RRM measurements with the relaxed period P2. For the second subset (or inter-frequency neighboring cell(s)), the processing circuitry 150 can implement relaxed (e.g., RRM measurements with a relaxed period P3) or no RRM measurements. The relaxed period P3 can be written as P3=N×P1 where N is a scaling factor that is larger than 1. The scaling factor N can be identical to or larger than the scaling factor M. P3 can be identical to or different from the relaxed period P2. In an example, P3 is longer than P2. In an example, the at least one relaxed period includes P2 and P3. The inter-frequency neighboring cell(s) can include neighboring cell(s) (also referred to as inter-RAT neighboring cell(s)) served by a radio access technology (RAT) that is different from a RAT for the serving cell. RRM measurements for the intra-frequency neighboring cell(s) and the inter-frequency neighboring cell(s) can be referred to as intra-frequency and inter-frequency RRM measurements, respectively. RRM measurements for the inter-RAT neighboring cell(s) can be referred to as inter-RAT RRM measurements.

In a first embodiment, the processing circuitry 150 can determine whether the electronic device 110 is to be switched from the current state to the next state based on the mobility and the location. In an example, the current state is the first state, and thus the electronic device is in the first state. During a period T1, the processing circuitry 150 can determine whether a first switching criterion I is satisfied. The first switching criterion I can include: 1) the serving cell is determined to remain the same serving cell (e.g., the signal strength of the signal in the serving cell is larger than a threshold S3), 2) the mobility is determined to be the low mobility (e.g., the signal variation of the signal in the serving cell is less than or equal to the threshold S1), and 3) the location is determined to be the first location (e.g., the signal strength of the signal is larger than the threshold l1 or the difference between the signal strength and the largest neighbor signal strength is larger than the threshold D1). When the first switching criterion I is determined to be satisfied, the processing circuitry 150 can determine that the electronic device 110 is to be switched from the first state to the second state.

In an example, the current state is the second state, and thus the electronic device is in the second state. During a period T2, the processing circuitry 150 can determine whether a first switching criterion II is satisfied. The first switching criterion II can include one of: 1) the serving cell is determined not to be suitable (e.g., the signal strength of the signal in the serving cell is less than a threshold S4), 2) the mobility is determined to be the high mobility (e.g., the signal variation of the signal in the serving cell is larger than the threshold S2), and 3) the location is determined to be the second location (e.g., the signal strength of the signal is less than or equal to the threshold l2 or the difference between the signal strength and the largest neighbor signal strength is less than or equal to the threshold D2). When the first switching criterion II is determined to be satisfied, the processing circuitry 150 can determine that the electronic device 110 is to be switched from the second state to the first state.

In a second embodiment, the processing circuitry 150 can determine whether the electronic device 110 is to be switched from the current state to the next state based on the mobility. In an example, the current state is the first state, and thus the electronic device is in the first state. During the period T1, the processing circuitry 150 can determine whether a second switching criterion I is satisfied. The second switching criterion I can include: 1) the serving cell is determined to remain the same serving cell (e.g., the signal strength of the signal in the serving cell is larger than the threshold S3) and 2) the mobility is determined to be the low mobility (e.g., the signal variation of the signal in the serving cell is less than or equal to the threshold S1). When the second switching criterion I is determined to be satisfied, the processing circuitry 150 can determine that the electronic device 110 is to be switched from the first state to the second state.

In an example, the current state is the second state, and thus the electronic device is in the second state. During the period T2, the processing circuitry 150 can determine whether a second switching criterion II is satisfied. The second switching criterion II can include one of: 1) the serving cell is determined not to be suitable (e.g., the signal strength of the signal in the serving cell is less than the threshold S4), 2) the mobility is determined to be the high mobility (e.g., the signal variation of the signal in the serving cell is larger than the threshold S2), and 3) a duration T3 (e.g., 24 hours) has passed, for example, after a previous cell selection/reselection. When the second switching criterion II is determined to be satisfied, the processing circuitry 150 can determine that the electronic device 110 is to be switched from the second state to the first state.

In a third embodiment, the processing circuitry 150 can determine whether the electronic device 110 is to be switched from the current state to the next state based on the location. In an example, the current state is the first state, and thus the electronic device is in the first state. During the period T1, the processing circuitry 150 can determine whether a third switching criterion I is satisfied. The third switching criterion I can include: 1) the serving cell is determined to remain the same serving cell (e.g., the signal strength of the signal in the serving cell is larger than the threshold S3) and 2) the location is determined to be the first location (e.g., the signal strength of the signal is larger than the threshold l1 or the difference between the signal strength and the largest neighbor signal strength is larger than the threshold D1). When the third switching criterion I is determined to be satisfied, the processing circuitry 150 can determine that the electronic device 110 is to be switched from the first state to the second state.

In an example, the current state is the second state, and thus the electronic device is in the second state. During the period T2, the processing circuitry 150 can determine whether a third switching criterion II is satisfied. The third switching criterion II can include one of: 1) the serving cell is determined not to be suitable (e.g., the signal strength of the signal in the serving cell is less than the threshold S4) and 2) the location is determined to be the second location (e.g., the signal strength of the signal is less than or equal to the threshold l2 or the difference between the signal strength and the largest neighbor signal strength is less than or equal to the threshold D2). When the third switching criterion II is determined to be satisfied, the processing circuitry 150 can determine that the electronic device 110 is to be switched from the second state to the first state.

In an embodiment, the electronic device 110 is configured with beamformed transmission/reception. A plurality of beams can be configured in a cell between the electronic device 110 and the network 101 (e.g., the base station 120). Signal strength of a signal in the cell can be determined based on the plurality of beams. The signal strength can be represented by largest beam strength of the plurality of beams, average beam strength of a subset of the plurality of beams, or the like. The subset can have one or more beam strengths that are larger than a beam strength threshold (e.g., a pre-configured threshold). The cell can be the serving cell or one of the one or more neighboring cells.

In an example, the electronic device 110 can set a serving cell strength reference value to a current Srxlev value of the serving cell when a following condition is satisfied: 1) after a new cell is selected/reselected or 2) if 'the signal variation of the serving cell is less than or equal to the threshold S1' has not been met for a pre-configured duration. Srxlev refers to a serving cell signal strength value.

The processing circuitry 150 can be implemented using various techniques, such as integrated circuits, one or more processors executing software instructions, and the like.

The memory 140 can be any suitable device for storing data and instructions to control operations of the electronic device 110. In an example, the memory 140 includes RRM memory 142 that stores information (e.g., the mobility, the location, thresholds, periods, switching criteria described above) and instructions associated with switching between the first state and the second state, the relaxed RRM measurements, and software instructions to be executed by a processor, such as the processing circuitry 150. The RRM memory 142 can store various results including signal strengths, signal variations, and/or the like in the serving cell and the one or more neighboring cells.

In an embodiment, the memory 140 can be non-volatile memory, such as read-only memory, flash memory, magnetic computer storage devices, hard disk drives, solid state drives, floppy disks, and magnetic tape, optical discs, and the like. In an embodiment, the memory 146 can be a random access memory (RAM). In an embodiment, the memory 146 can include non-volatile memory and volatile memory.

The network 101 can include processing circuitry 125 that can configure a relaxation mode (or trigger criteria) for the electronic device 110. The relaxation mode can be signaled to the electronic device 110. The relaxation mode can indicate when the electronic device 110 can implement the relaxed RRM measurements (or be switched to the second state). In an example, the relaxation mode indicates that the electronic device 110 can implement the relaxed RRM measurements when the electronic device 110 has the low mobility and is not at the cell edge of the serving cell, as described in the first embodiment. In an example, the relaxation mode indicates that the electronic device 110 can implement the relaxed RRM measurements when the electronic device 110 has the low mobility, as described in the second embodiment. In an example, the relaxation mode indicates that the electronic device 110 can implement the relaxed RRM measurements when the electronic device 110 is not at the cell edge of the serving cell or the location is the second location, as described in the third embodiment.

The processing circuitry 125 can configure various parameters for the relaxed RRM measurements, such as the thresholds S1-S4, l1, l2, D1, and D2, as described above.

The parameters can also include various timers used for evaluation for state transition (or switching), for example, between the first state and the second state. The timers can indicate certain fixed duration(s) (e.g., the period P3 is 1 hour, 24 hours) or relative periodicity (e.g., the relaxed period P2 is twice the normal period P1 where the scaling factor is 2). In an example, the processing circuitry 125 is included in the base station 120. Alternatively, the processing circuitry 125 can be located outside the base station 120.

One or more of the relaxation mode and the parameters can be signaled (e.g., via broadcasting) to the electronic device 110. Alternately, one or more of the relaxation mode and the parameters can be pre-configured for the electronic device 110 and stored in the RRM memory 142. In an example, a scaling factor (e.g., M, N) can be pre-configured.

Figure 2:
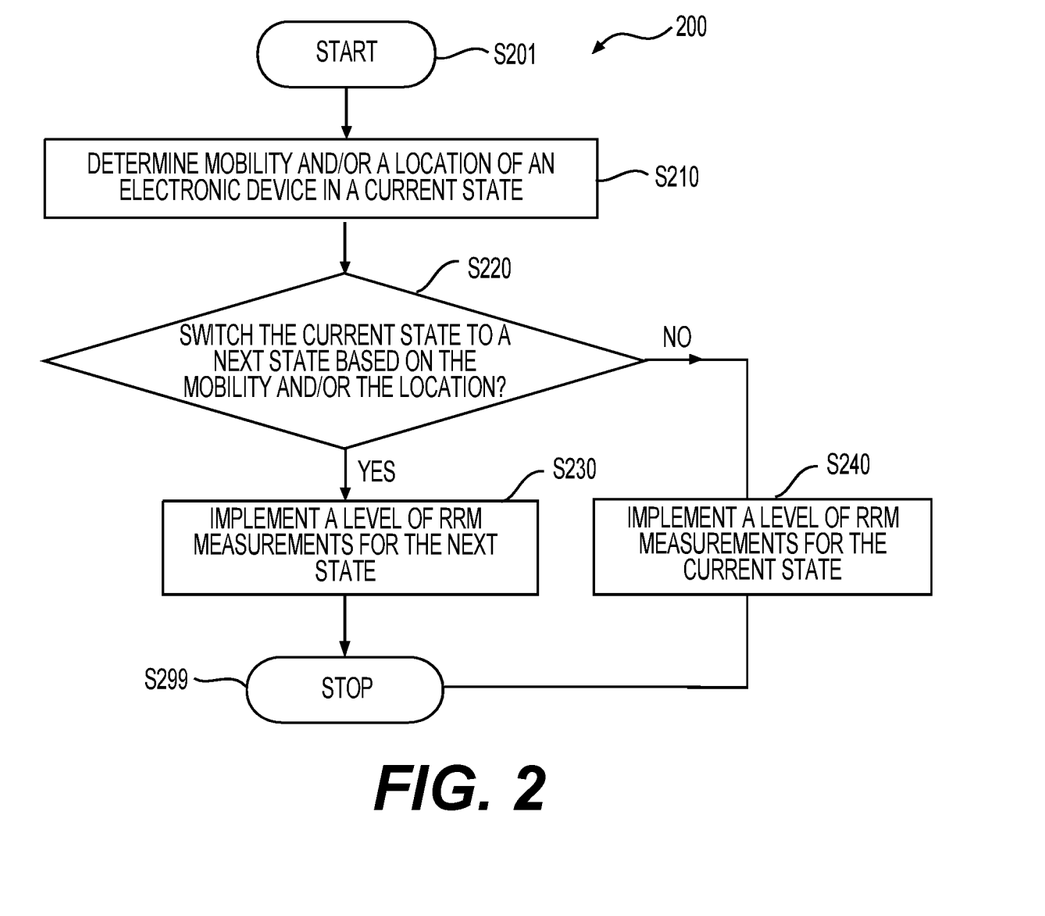
FIG. 2 shows a flow chart of an exemplary process 200 according to an embodiment of the disclosure.

FIG. 2 shows a flowchart of an exemplary process 200 according to an embodiment of the disclosure. The process 200 can be implemented by an electronic device (e.g., the electronic device 110). In an example, the electronic device is in an idle mode (e.g., RRC_IDLE) or an inactive mode (e.g., RRC INACTIVE). The electronic device is served by a serving cell. One or more neighboring cells can be adjacent to the serving cell. The electronic device can be in a current state that is one of the first state and the second state, as described above. The process 200 starts at S201 and proceeds to S210.

At S210, mobility and/or a location of the electronic device within the serving cell can be determined, as described above. The mobility and/or the location can be determined based on a signal in the serving cell. In some examples, the location can be determined based on the signal in the serving cell and signal(s) in the one or more neighboring cells.

At S220, whether to switch the electronic device from the current state to a next state can be determined based on the mobility and/or the location determined at S210, as described above with reference to FIG. 1 (e.g., the first embodiment, the second embodiment, the third embodiment). The next state is one of the first state and the second state and is different from the current state.

When the electronic device is determined to be switched from the current state to the next state, the process 200 proceeds to S230. Otherwise, the process 200 proceeds to S240.

At S230, a level of RRM measurements for the next state can be implemented for the electronic device, as described above. For example, when the next state is the second state, the relaxed level of RRM measurements can be performed for the one or more neighboring cells. When the next state is the first state, the normal level of RRM measurements can be performed for the one or more neighboring cells. The process 200 proceeds to S299, and terminates.

At S240, a level of RRM measurements for the current state can be implemented for the electronic device, as described above. For example, when the current state is the second state, the relaxed level of RRM measurements can be performed for the one or more neighboring cells. When the current state is the first state, the normal level of RRM measurements can be performed for the one or more neighboring cells. The process 200 proceeds to S299, and terminates.

Steps in the process 200 can be implemented using any suitable order. Further, one or more of the steps in the process 200 can be modified, combined, or omitted. Additional step(s) can be added. The process 200 can be suitably adapted for various applications and scenarios in communication systems, such as shown below in FIGS. 3-5.

Figure 3:
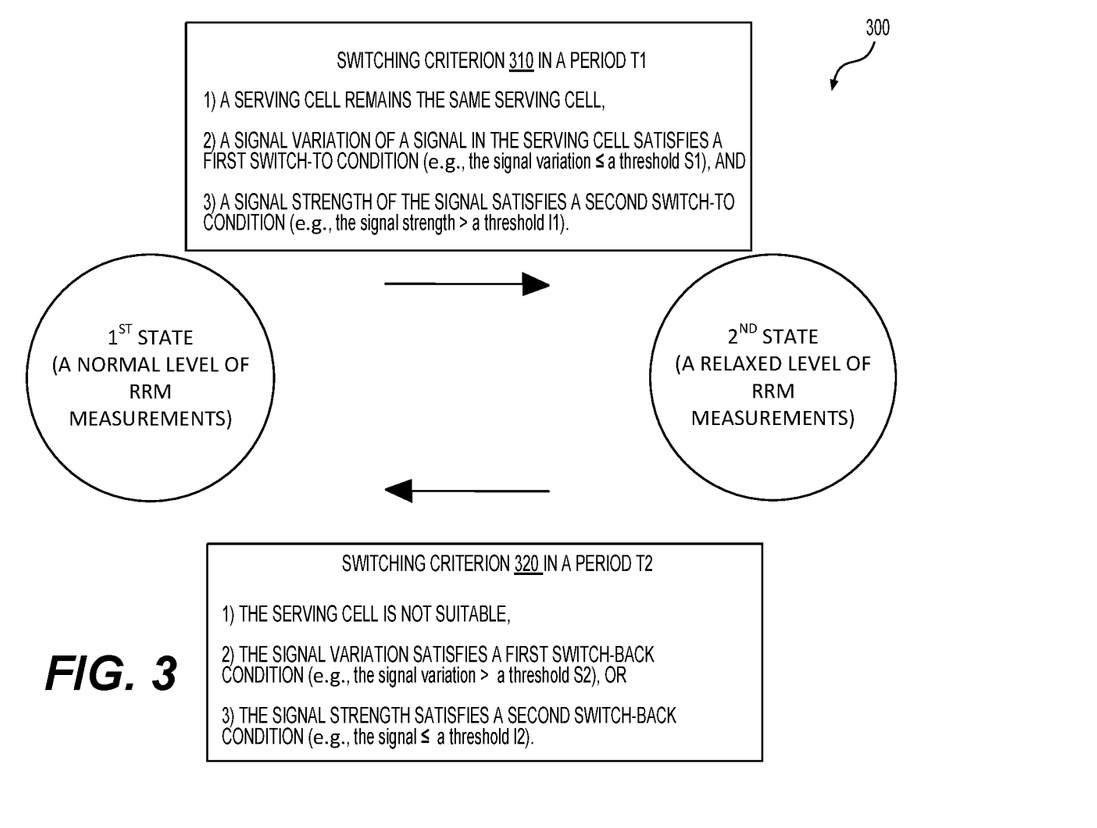
FIGS. 3-5 show exemplary state diagrams 300, 400, and 500 according to embodiments of the disclosure.
Figure 4:
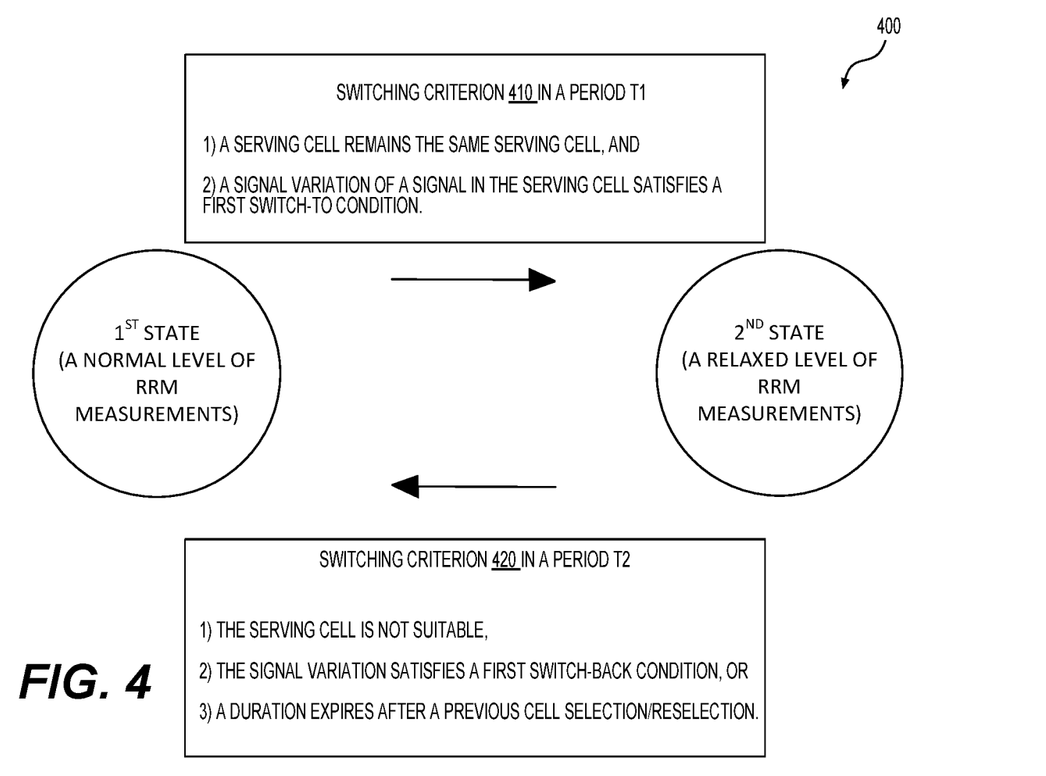
Figure 5:
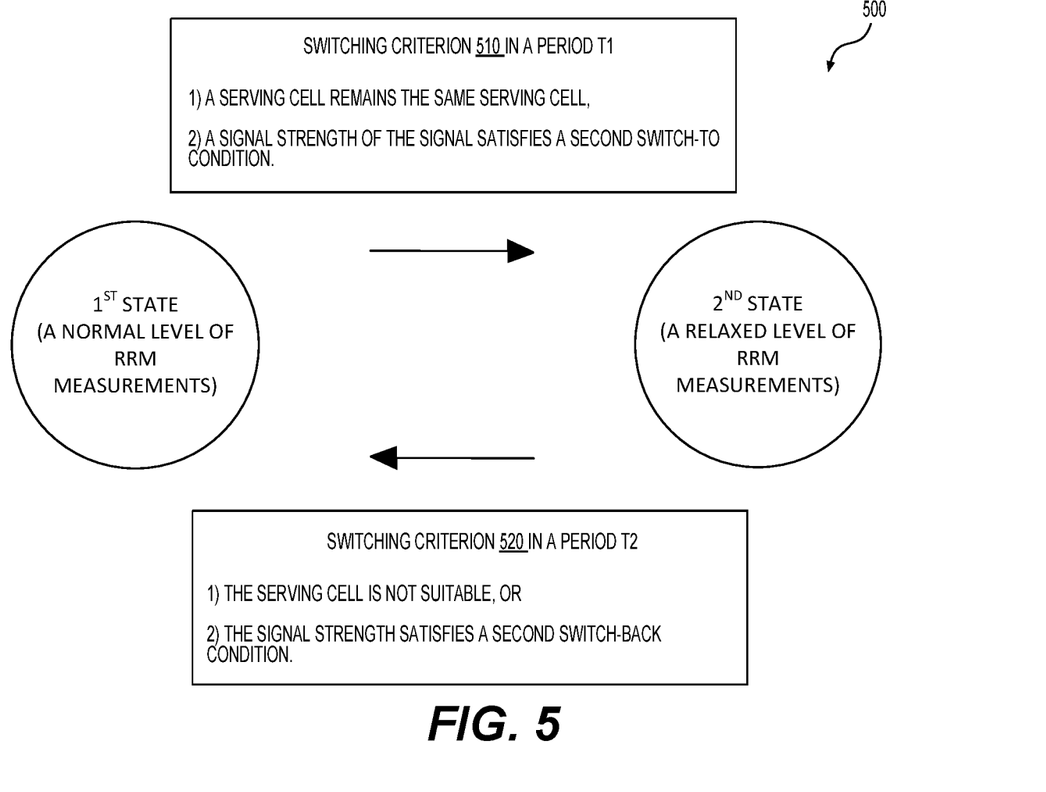

FIGS. 3-5 show exemplary state diagrams 300, 400, and 400 according to embodiments of the disclosure. The first state corresponding to the normal level of RRM measurements and the second state corresponding to the relaxed level of RRM measurements are shown. An electronic device (e.g., the electronic device 110) can be in the first state or the second state. Further, the electronic device can be switched between the first state and the second state.

Referring to FIG. 3, in an example, the electronic device is in the first state. In the period T1, when a switching criterion 310 is satisfied, the electronic device can be switched from the first state to the second state. The switching criterion 310 can be based on mobility and a location of the electronic device. In an example shown in FIG. 3, the switching criterion 310 includes: 1) a serving cell for the electronic device remains the same serving cell (e.g., signal strength of a signal in the serving cell is larger than a threshold), 2) a signal variation of the signal in the serving cell satisfies a first switch-to condition (e.g., the signal variation is less than or equal to the threshold S1), and 3) the signal strength of the signal in the serving cell satisfies a second switch-to condition (e.g., the signal strength is larger than the threshold l1, or a difference between the signal strength and largest neighbor signal strength is larger than the threshold D1, as described in the first embodiment). In an example, the signal variation satisfying the first switch-to condition indicates that the mobility is the low mobility. The signal strength satisfying the second switch-to condition indicates that the location is not at an edge of the serving cell.

Referring to FIG. 3 again, in an example, the electronic device is in the second state. In the period T2, when a switching criterion 320 is satisfied, the electronic device can be switched from the second state to the first state. The switching criterion 320 can be based on the mobility and the location of the electronic device. In an example shown in FIG. 3, the switching criterion 320 includes one or more of: 1) the serving cell for the electronic device is not suitable (e.g., the signal strength of the signal in the serving cell is less than a threshold), 2) the signal variation of the signal in the serving cell satisfies a first switch-back condition (e.g., the signal variation is larger than the threshold S2), and 3) the signal strength of the signal in the serving cell satisfies a second switch-back condition (e.g., the signal strength is less than or equal to the threshold l2 or the difference between the signal strength and the largest neighbor signal strength is less than or equal to the threshold D2). In an example, the signal variation satisfying the first switch-back condition indicates that the mobility is the high mobility. The signal strength satisfying the second switch-back condition indicates that the location is at the edge of the serving cell.

Referring to FIG. 4, in an example, the electronic device is in the first state. In the period T1, when a switching criterion 410 is satisfied, the electronic device can be switched from the first state to the second state. The switching criterion 410 can be based on the mobility of the electronic device. In an example shown in FIG. 4, the switching criterion 410 includes: 1) the serving cell for the electronic device remains the same serving cell, as described above with reference to FIG. 3, and 2) the signal variation of the signal in the serving cell satisfies the first switch-to condition, as described above with reference to FIG. 3.

Referring to FIG. 4 again, in an example, the electronic device is in the second state. In the period T2, when a switching criterion 420 is satisfied, the electronic device can be switched from the second state to the first state. The switching criterion 420 can be based on the mobility. In an example shown in FIG. 4, the switching criterion 420 includes one or more of: 1) the serving cell for the electronic device is not suitable, as described above with reference to FIG. 3, 2) the signal variation of the signal in the serving cell satisfies the first switch-back condition, as described above with reference to FIG. 3, and 3) a certain period (e.g., 1 hour, 24 hours) expires (or has passed) after a previous cell selection/reselection.

Referring to FIG. 5, in an example, the electronic device is in the first state. In the period T1, when a switching criterion 510 is satisfied, the electronic device can be switched from the first state to the second state. The switching criterion 510 can be based on the location of the electronic device. In an example shown in FIG. 5, the switching criterion 510 includes: 1) the serving cell for the electronic device remains the same serving cell, as described above with reference to FIG. 3, and 2) the signal strength of the signal in the serving cell satisfies the second switch-to condition, as described above with reference to FIG. 3.

Referring to FIG. 5 again, in an example, the electronic device is in the second state. In the period T2, when a switching criterion 520 is satisfied, the electronic device can be switched from the second state to the first state. The switching criterion 520 can be based on the location of the electronic device. In an example shown in FIG. 5, the switching criterion 520 includes one or more of: 1) the serving cell for the electronic device is not suitable, as described above with reference to FIG. 3, and 2) the signal strength of the signal in the serving cell satisfies the second switch-back condition, as described above with reference to FIG. 3.

Referring to FIGS. 3-5, when the electronic device is in the first state or is switched from the second state to the first state, the normal level of RRM measurements can be performed for the one or more neighboring cells. When the electronic device is in the second state or is switched from the first state to the second state, the relaxed level of RRM measurements can be performed for the one or more neighboring cells, as described above. For example, the relaxed period P2 or the relaxed period P3 can be longer than the normal period P1. P2 or P3 can be equal to 2P1, 4P1, 16P1, or the like. In an example, no RRM measurements are performed for the one or more neighboring cells. In an example, intra-frequency RRM measurements with the relaxed period P2 can be performed for intra-frequency neighboring cell(s) while relaxed (e.g., with the relaxed period P3) or no inter-frequency (including inter-RAT) RRM measurements can be performed for inter-frequency (including inter-RAT) neighboring cell(s).

The various circuitry, circuits, components, modules, and the like in the present disclosure can be implemented using any suitable technology, such as an integrated circuit (IC), ICs, digital signal processors (DSPs), microprocessors, CPUs, field programmable gate arrays (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for radio resource management (RRM) measurements, comprising:
   determining, based on a signal received in a serving cell for an electronic device, a location of the electronic device within the serving cell and a mobility of the electronic device, the electronic device being in one of a first state and a second state for RRM measurements and being in the same serving cell, a normal level of RRM measurements being implemented for one or more neighboring cells of the serving cell when the electronic device is in the first state, a relaxed level of RRM measurements being implemented for the one or more neighboring cells when the electronic device is in the second state, and the relaxed level of RRM measurements including at least one relaxed period that is longer than a normal period for the normal level of RRM measurements;
   determining whether the electronic device is to be switched from the one of the first state and the second state to another of the first state and the second state based on the mobility and the location; and
   in response to the electronic device being determined to be switched, implementing a level of RRM measurements for the one or more neighboring cells based on the other of the first state and the second state, wherein
   during a period T1, the location being determined, based on a comparison of a signal strength of the received signal with one or more signal strength thresholds,
   the determining the mobility includes determining that the mobility is a low mobility when a signal variation of the received signal is less than or equal to a mobility threshold S1, and
   the determining whether the electronic device is to be switched includes determining that the electronic device is to be switched from the first state to the second state when the mobility is determine determined to be the low mobility and the location is determined to be a first location that is not at a cell edge of the serving cell.

2. The method according to claim 1, wherein determining the location and the mobility comprises:
   determining the location based on a signal strength of the received signal, the location being one of 1) a first location being not at a cell edge of the serving cell and 2) a second location being at the cell edge of the serving cell, the first location being further away from the cell edge of the serving cell than the second location; and
   determining the mobility based on a comparison of a signal variation of the received signal with a mobility threshold, the mobility being one of 1) a low mobility and 2) a high mobility.

3. The method according to claim 2, wherein the electronic device is determined to be switched from the first state to the second state; and implementing the level of RRM measurements for the one or more neighboring cells of the serving cell based on the second state includes implementing the relaxed level of RRM measurements including one of 1) no RRM measurements for the one or more neighboring cells, and 2) RRM measurements for the one or more neighboring cells with the at least one relaxed period that is longer than the normal period P1 for the normal level of RRM measurements.

4. The method according to claim 3, wherein
   the one or more neighboring cells include a first subset with an identical carrier frequency as that of the serving cell and a second subset with carrier frequencies different from that of the serving cell; and
   implementing the RRM measurements with the at least one relaxed period includes:

implementing the RRM measurements for the first subset with a relaxed period P2 that is longer than the normal period P1, the at least one relaxed period including P2; and implementing, for the second subset, no RRM measurements or the RRM measurements with a relaxed period P3 that is longer than the normal period P1, the at least one relaxed period including P3.

5. The method according to claim 2, wherein
the one of the first state and the second state is the second state;
the other of the first state and the second state is the first state; and
during a period T2,
    determining the location further includes determining that the location is the second location when the signal strength is less than or equal to a threshold l2;
    determining the mobility further includes determining that the mobility is the high mobility when the signal variation is larger than the mobility threshold S2; and
    determining whether the electronic device is to be switched further includes determining that the electronic device is to be switched from the second state to the first state when the mobility is determined to be the high mobility or the location is determined to be the second location.

6. The method according to claim 2, wherein
the one of the first state and the second state is the first state;
the other of the first state and the second state is the second state;
the method further includes determining a largest neighbor signal strength based on one or more signals from the respective one or more neighboring cells; and
during a period T1,
    determining the location further includes determining that the location is the first location when the signal strength is larger than a sum of 1) the largest neighbor signal strength and 2) a threshold D1;
    determining the mobility further includes determining that the mobility is the low mobility when the signal variation is less than or equal to the mobility threshold S1; and
    determining whether the electronic device is to be switched further includes determining that the electronic device is to be switched from the first state to the second state when the mobility is determined to be the low mobility and the location is determined to be the first location.

7. The method according to claim 6, wherein
the electronic device is determined to be switched from the first state to the second state; and
implementing the level of RRM measurements for the one or more neighboring cells of the serving cell based on the second state includes implementing the relaxed level of RRM measurements including one of: 1) no RRM measurements for the one or more neighboring cells, and 2) RRM measurements for the one or more neighboring cells with the at least one relaxed period that is longer than the normal period P1 for the normal level of RRM measurements.

8. The method according to claim 2, wherein
the one of the first state and the second state is the second state;
the other of the first stale and the second state is the first state;
the method further includes determining a largest neighbor signal strength based on one or more signals from the respective one or more neighboring cells; and
during a period T2,
    determining the location further includes determining that the location is the second location when the signal strength is less than or equal to a sum of 1) the largest neighbor signal strength and 2) a threshold D2;
    determining the mobility further includes determining that the mobility is the high mobility when that the signal variation is larger than the mobility threshold S2; and
    determining whether the electronic device is to be switched further includes determining that the electronic device is to be switched from the second state to the first state when the mobility is determined to be the high mobility or the location is determined to be the second location.

9. The method according to claim 2, wherein
a plurality of beams is configured in the serving cell between the electronic device and a network; and
the signal strength of the received signal is one of 1) a largest beam strength of the plurality of beams and 2) an average beam strength of a subset of the plurality of beams, the subset having one or more beam strengths larger than a beam strength threshold.

10. An electronic device for radio resource management (RRM) measurements, comprising processing circuitry configured to: determine, based on a signal received in a serving cell for the electronic device, a location of the electronic device within the serving cell and a mobility of the electronic device, the electronic device being in one of a first state and a second state for RRM measurements and being in the same serving cell, a normal level of RRM measurements being implemented for one or more neighboring cells of the serving cell when the electronic device is in the first state, a relaxed level of RRM measurements being implemented for the one or more neighboring cells when the electronic device is in the second state, and the relaxed level of RRM measurements including at least one relaxed period that is longer than a normal period for the normal level of RRM measurements; determine whether the electronic device is to be switched from the one of the first state and the second state to another of the first state and the second state based on the mobility and the location; and in response to the electronic device being determined to be switched, implement a level of RRM measurements for the one or more neighboring cells based on the other of the first state and the second state, wherein
    during a period T1, the location being determined, based on a comparison of a signal strength of the received signal with one or more signal strength thresholds,
    the determining the mobility includes determining that the mobility is a low mobility when a signal variation of the received signal is less than or equal to a mobility threshold S1, and
    the determining whether the electronic device is to be switched includes determining that the electronic device is to be switched from the first state to the second state when the mobility is determine determined to be the low mobility and the location is determined to be a first location that is not at a cell edge of the serving cell.

11. The electronic device according to claim 10, wherein the processing circuitry is configured to:

determine the location based on a signal strength of the received signal, the location being one of 1) a first location being not at a cell edge of the serving cell and 2) a second location being at the cell edge of the serving cell; the first location being further away from the cell edge of the serving cell than the second location; and determine the mobility based on a comparison of a signal variation of the received signal with a mobility threshold, the mobility being one of 1) a low mobility and 2) a high mobility.

12. The electronic device according to claim 11, wherein the electronic device is determined to be switched from the first state to the second state; and the processing circuitry is configured to implement the relaxed level of RRM measurements that includes one of: 1) no RRM measurements for the one or more neighboring cells, and 2) RRM measurements for the one or more neighboring cells with at least one relaxed period that is longer than the normal period P1 for the normal level of RRM measurements.

13. The electronic device according to claim 12, wherein
the one or more neighboring cells include a first subset with an identical carrier frequency as that of the serving cell and a second subset with carrier frequencies different from that of the serving cell; and the processing circuitry is configured to implement the RRM measurements with the at least one relaxed period by
implementing the RRM measurements for the first subset with a relaxed period P2 that is longer than the normal period P1, the at least one relaxed period including P2; and
implementing, for the second subset, no RRM measurements or the RRM measurements with a relaxed period P3 that is longer than the normal period P1, the at least one relaxed period including P3.

14. The electronic device according to claim 11, wherein
the one of the first state and the second state is the second state;
the other of the first state and the second state is the first state; and
during a period T2, the processing circuitry is configured to:
determine that the location is the second location when the signal strength is less than or equal to a threshold 12;
determine that the mobility is the high mobility when the signal variation is larger than the mobility threshold S2; and
determine that the electronic device is to be switched from the second state to the first state when the mobility is determined to be the high mobility or the location is determined to be the second location.

15. The electronic device according to claim 11, wherein
the one of the first state and the second state is the first state;
the other of the first state and the second state is the second state;
the processing circuitry is configured to:
determine a largest neighbor signal strength based on one or more signals from the respective one or more neighboring cells; and
during a period T1,
determine that the location is the first location when the signal strength is larger than a sum of 1) the largest neighbor signal strength and 2) a threshold D1;

determine that the mobility is the low mobility when the signal variation is less than or equal to the mobility threshold S1; and determine that the electronic device is to be switched from the first state to the second state when the mobility is determined to be the low mobility and the location is determined to be the first location.

16. The electronic device according to claim 15, wherein
the electronic device is determined to be switched from the first state to the second state; and
the processing circuitry is configured to implement the relaxed level of RRM measurements that includes one of: 1) no RRM measurements for the one or more neighboring cells, and 2) RRM measurements for the one or more neighboring cells with the at least one relaxed period that is longer than the normal period P1 for the normal level of RRM measurements.

17. The electronic device according to claim 11, wherein
a plurality of beams is configured in the serving cell between the electronic device and a network; and
the signal strength of the received signal is one of 1) a largest beam strength of the plurality of beams and 2) an average beam strength of a subset of the plurality of beams, the subset having one or more beam strengths larger than a beam strength threshold.

18. A method for configuration of radio resource management (RRM) measurements, comprising: configuring, by processing circuitry of a network, a relaxation mode for an electronic device, the relaxation mode indicating that a mobility and a location of the electronic device are used to determine whether the electronic device is to be switched between a normal level of RRM measurements for one or more neighboring cells of a serving cell for the electronic device and a relaxed level of RRM measurements for the one or more neighboring cells, the electronic device being in one of a first state and a second state for RRM measurements and being in the same serving cell, the first state for RRM measurements corresponding to the normal level of RRM measurements, the second state for RRM measurements corresponding to the relaxed level of RRM measurements, and the relaxed level of RRM measurements including at least one relaxed period that is longer than a normal period for the normal level of RRM measurements; and configuring parameters used to determine whether the electronic device is to be switched between the normal lex el of RRM measurements and the relaxed level of RRM measurements, wherein during a period T1, the location being determined, based on a comparison of a signal strength of the received signal with one or more signal strength thresholds, the determining the mobility includes determining that the mobility is a low mobility when a signal variation of the received signal is less than or equal to a mobility threshold S1, and the determining whether the electronic device is to be switched includes determining that the electronic device is to be switched from the first state to the second state when the mobility is determine determined to be the low mobility and the location is determined to be a first location that is not at a cell edge of the serving cell.

* * * * *